Figure 12:
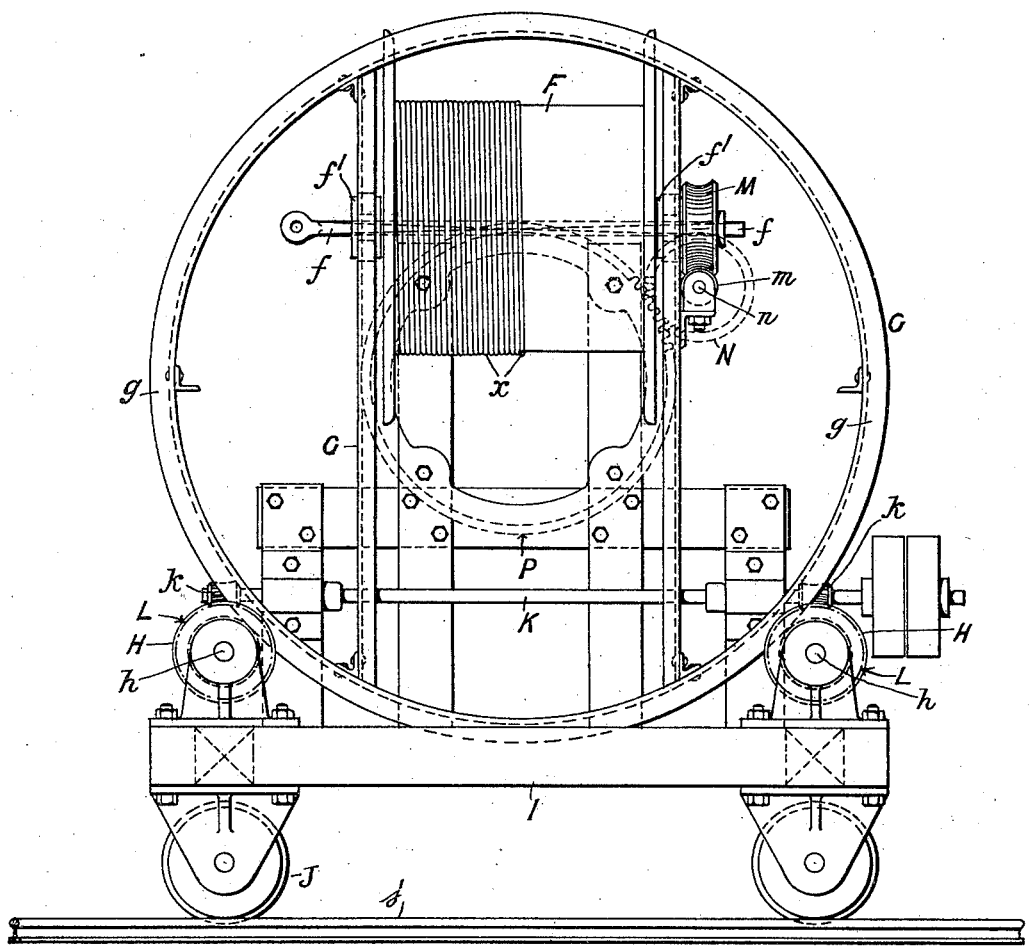

No. 699,458. Patented May 6, 1902.
H. W. DOVER.
METHOD OF COVERING ELECTRIC CONDUCTORS AND MAKING CABLES.
(Application filed Feb. 1, 1902.)
(No Model.) 5 Sheets—Sheet 1.
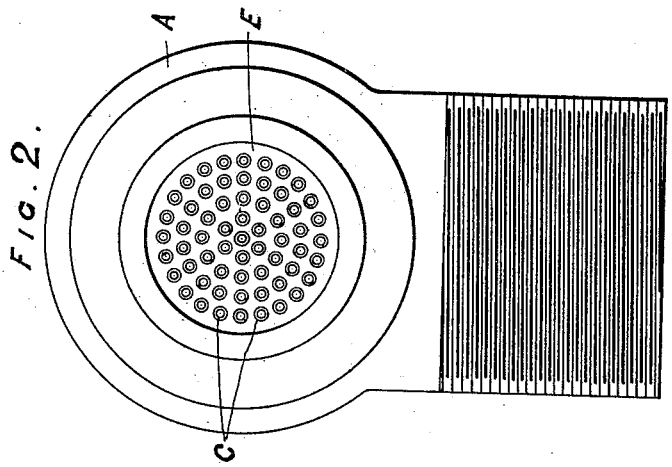
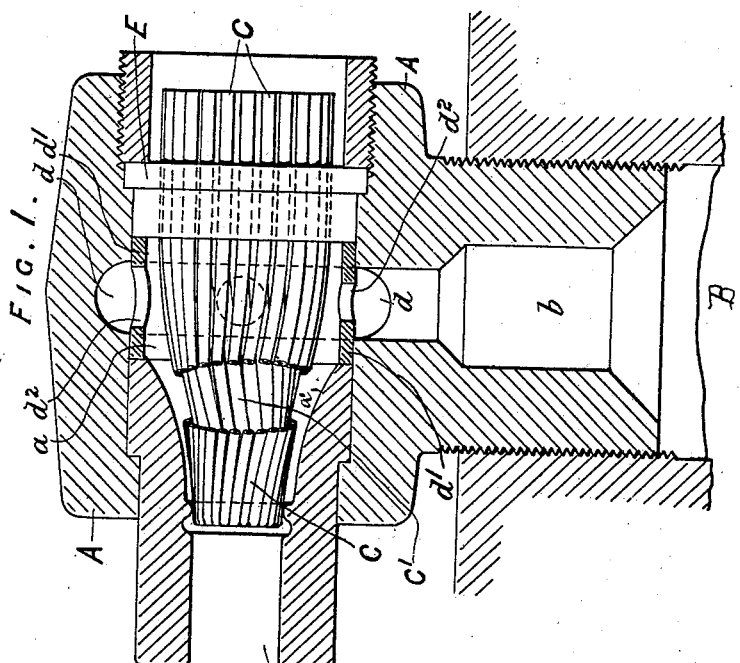
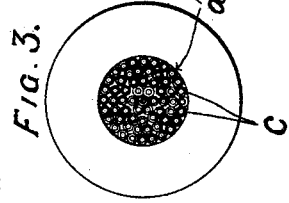
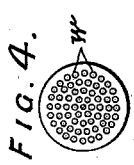
WITNESSES:
W. M. Avery
C. E. Holske
INVENTOR
Horace W. Dover
BY
ATTORNEYS No. 699,458. Patented May 6, 1902.
H. W. DOVER.
METHOD OF COVERING ELECTRIC CONDUCTORS AND MAKING CABLES.
(Application filed Feb. 1, 1902.)
(No Model.) 5 Sheets—Sheet 2.
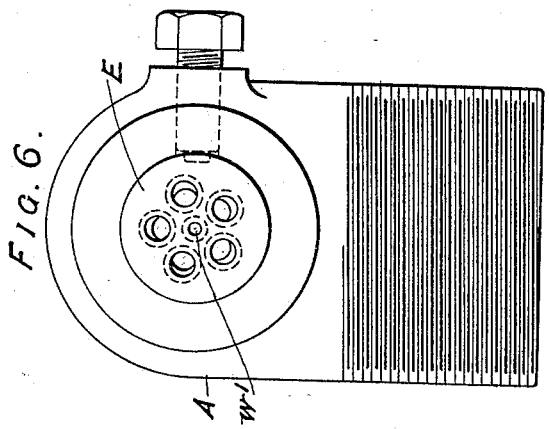
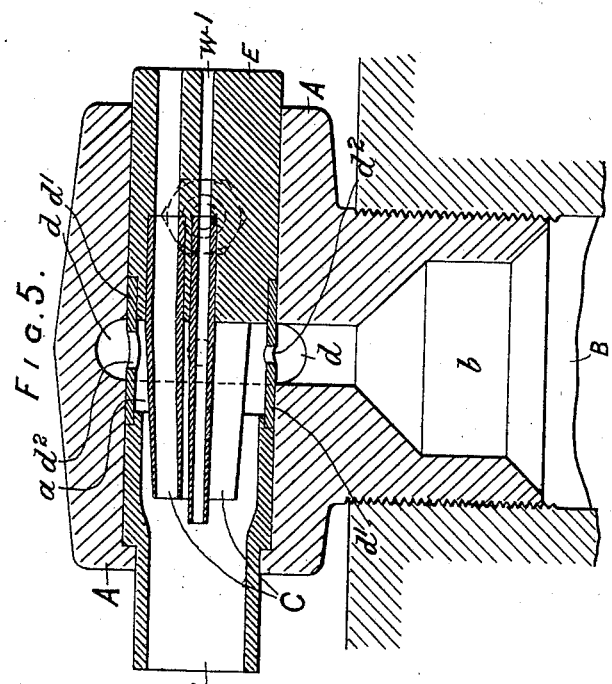
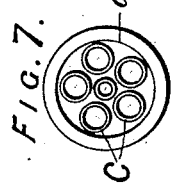
WITNESSES:
W. M. Avery
C. E. Holste
INVENTOR
Horace W. Dover
BY
ATTORNEYS No. 699,458. Patented May 6, 1902.
H. W. DOVER.
METHOD OF COVERING ELECTRIC CONDUCTORS AND MAKING CABLES.
(Application filed Feb. 1, 1902.)
(No Model.) 5 Sheets—Sheet 3.
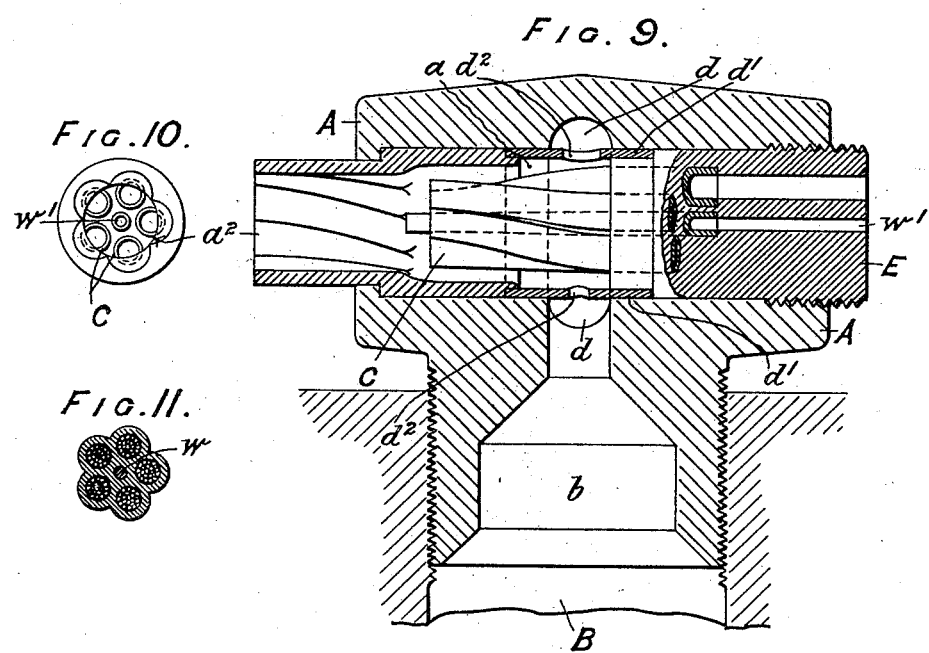
WITNESSES:
W. M. Avery
C. E. Holake
INVENTOR
Horace W. Dover
BY
ATTORNEYS No. 699,458. Patented May 6, 1902.
H. W. DOVER.
METHOD OF COVERING ELECTRIC CONDUCTORS AND MAKING CABLES.
(Application filed Feb. 1, 1902.)
(No Model.) 5 Sheets—Sheet 4.

WITNESSES:
W. M. Avery
C. E. Holske

INVENTOR
Horace W. Dover
BY
ATTORNEYS

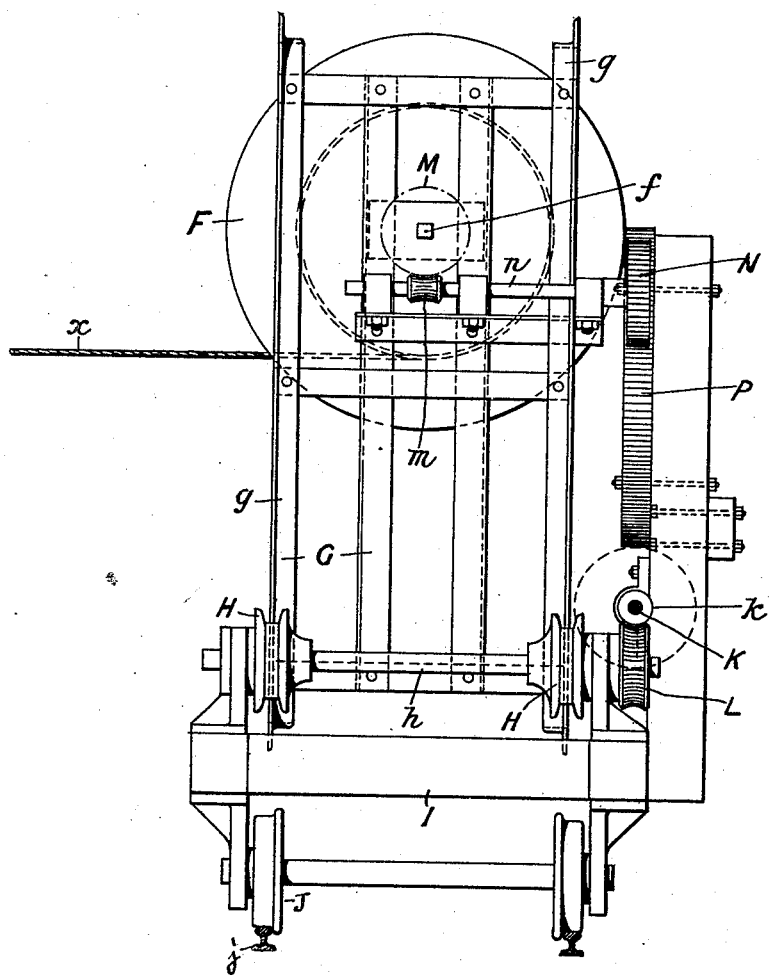

UNITED STATES PATENT OFFICE.

HORACE WALTER DOVER, OF NORTHAMPTON, ENGLAND.

METHOD OF COVERING ELECTRIC CONDUCTORS AND MAKING CABLES.

SPECIFICATION forming part of Letters Patent No. 699,458, dated May 6, 1902.

Application filed February 1, 1902. Serial No. 92,226. (No model.)

*To all whom it may concern:*

Be it known that I, HORACE WALTER DOVER, managing director of Dover, Limited, a subject of the King of Great Britain, residing at Park road, St. James End, Northampton, England, have invented new and useful Improvements in Methods of Covering Electric Conductors and Making Cables, of which the following is a specification.

This invention relates to an improvement in the method of covering wires (whether plain or stranded and whether singly or in pairs or groups) with celluloid, xylonite, or similar material.

The invention relates to the manufacture of telephonic and telegraphic cables at a single operation by the application of the insulating and protective material simultaneously to the conductor or conductors and to wire or fibrous cords used to impart tensile strength to the cable and which are protected from the destructive influences of the air or water by the covering of insulating material in which they are embedded. The insulating material is applied to the wire or wires and cords by extrusion in the plastic state through a die, which is traversed by the wire or wires and cords to be covered, a twist being at same time imparted which is rendered permanent by the setting of the insulating material.

The invention will be described with reference to the accompanying drawings, forming part of this specification, wherein are represented forms of tools respectively adapted for covering multiple wires and stranded wires or cords, together with sections of the covered wires or cables produced.

Figure 1 is a longitudinal sectional view, and Figs. 2 and 3 are end views of a tool for covering a plurality of wires and incorporating them at one operation in the form of a cable, as shown in cross-section in Fig. 4. Figs. 5, 6, 7 are similar views of a tool for similarly covering and incorporating in cable form a central stranded conductor surrounded by wire or fibrous cords to impart the tensile strength required for a submarine cable, as shown in Fig. 8. Figs. 9 and 10 show a modification, and Fig. 11 shows a cross-section of the cable. Fig. 12 is a front elevation, and Fig. 13 a side elevation, of apparatus for imparting twist to the cable or taking up twist imparted by the die.

Referring to Figs. 1, 2, 3, 4, A is the die-box, screwed to or otherwise connected with the steam-jacketed pressure-chamber B of a "stuffing" machine or press capable of exerting a pressure of, say, one and one-fourth tons per square inch. The chamber $a$ of the die-box is in communication with the pressure-cylinder by an orifice $b$, and terminates in a coned portion $a'$ leading to an orifice $a^2$, with parallel sides or very slightly coned, the length of the orifice $a^2$ being such as to insure a sufficient grip of the wires by the covering material to cause the wires to be fed through along with the covering material without tension being otherwise applied to the wires.

C represents tubular guide-mandrels or wire guides, each formed of a steel tube, the several tubes being mounted in and traversing a bush E, which closes the rear end of the die-box A, the tubular guide-mandrels being spaced and in concentric circles in said bush and being gradually brought closer together at their front ends, where they are in close juxtaposition.

In order to maintain a uniform pitch of the guide-mandrels of the innermost and outermost circles and also maintain uniformity of distance between the circles themselves, the guide-mandrels are given a slight spiral inclination alternately to the right and the left hand for successive circles, so that the guide-mandrels of adjacent circles lie across each other and are prevented from being forced, those of the one circle into the space between those of the other circle, the guide-mandrels being tapered toward the exit-nozzle. This opposite-handed twist of the guide-mandrels is shown in Fig. 1 by a portion of the outer circle of guide-mandrels being broken out to show the opposite twist of the circle C' of guide-mandrels immediately within, the alternation of twist being repeated for the remainder of the circles, the central guide-mandrel alone being straight.

As the guide-mandrels are widely separated toward the bush E and gradually converge toward the exit-nozzle, the intervening spaces are of gradually-decreasing sectional area in the direction of the flow of the insulating material, so that while easy admission for the material to the innermost spaces between the guide-mandrels and a uniform distribution of the material is provided for an increase in the density of the material consequent on its forcible extrusion through passages of diminishing area will be insured, while the direction of movement of the mass of material at the point of emergence from between the guide-mandrels is caused to so nearly approach the direction of the wires passing through the nozzles as to insure that the wires shall be drawn through the guide-mandrels, in which they are an easy fit.

$d$ is a circumferential channel separated from the space $a$ by a liner-ring $d'$, but communicating therewith by orifices $d^2$, the liner having for effect to divert the material entering at $b$ in opposite directions through the annular channel $d$, whence it passes through the orifices $d^2$, which are so spaced and so graduated in diameter as to equalize the flow of material throughout the die-chamber.

The insulating material on emerging through the spaces between the closely juxtaposed guide-mandrels being still plastic coalesces in the form of a solid mass around and between the wires which are thus embedded therein, so as to form a cable in which the wires are severally insulated from each other and from external influences.

In order to admit of the cable being coiled on a drum and uncoiled or unwound without straining or kinking the wires, a twist would be imparted to the cable before the insulating material becomes set, so as to cause the wires to assume a spiral form of long pitch around the central wire, this twist becoming permanent by the subsequent setting of the material. The twist would be imparted by making the drum on which the cable is wound after leaving the nozzle rotate both about its own axis and also about an axis at right angles thereto, as hereinafter described in reference to Figs. 12 and 13.

The tool shown in Figs. 5, 6, and 7 is substantially similar to that above described, except that the guide-mandrels are of larger diameter in order to give passage to stranded wires or cords adapted the central one to act as the electric conductor and the outer ones to impart the necessary tensile strength to a cable for submarine purposes. The guide-mandrels converge toward the extrusion-nozzle, so that the intervening spaces for the passage of the insulating material will be of gradually diminishing sectional area toward the point of emergence, the tubes being externally tapered to a sharp edge toward the nozzle, so as to enable the insulating material to be delivered from the intervening passages closely around the stranded wires or cords. In this case the outer guide-mandrels may be spirally inclined all in the same direction about the central guide-mandrel, so as to cause a twist to be imparted to the cable while being extruded, the nozzle being correspondingly rifled, as shown in Figs. 9 and 10, so as to assist in imparting the desired twist and economize insulating material by giving the cable the section shown in Fig. 11. The amount of twist thus put into the tension strands or cords by the rifling of the die-nozzle and the spiral inclination of the guide-mandrels would in this case be allowed for or maintained in winding the cable on a drum by means of the apparatus shown in Figs. 12 and 13 and hereinafter described, the twist thus received being rendered permanent by the setting of the insulating material, while the cable remains in the coiled form.

The apparatus for imparting twist to the cable after extrusion from the die or for taking up the twist imparted to the cable by the die, formed as described in reference to Fig. 9, is shown in Figs. 12 and 15. It consists of a drum F, on which the cable $x$ is wound, carried by a spindle $f$, mounted to revolve in bearings in cross-bars of a cylindrical frame G, having its axis at right angles to the drum-spindle $f$ and substantially in alinement with the nozzle, (not shown in Figs. 12 and 13,) from which the cable is extruded. The frame G may be formed of a pair of flanged rings $g$, braced by cross-bars and mounted to rotate about its own axis on pairs of grooved rollers H, carried by axles $h$, mounted in bearings on a trolley I, supported on wheels J, adapted to run to and fro on rails $j$ at right angles to the line of pull, so as to enable the cable to be laid evenly on the drum. The frame G is revolved about its own axis by a worm-shaft K, driven by any convenient power, having worms $k$, which gear with worm-wheels L, fast on the spindle $h$, the rollers H rotating the frame G by frictional contact with the rings $g$, resting thereon, the rotation of the frame G causing the drum to be rotated about an axis at right angles to its own axis $f$. The drum F is at same time rotated about its axis for the purpose of winding up the cable by a worm-wheel M, journaled in a bearing on the cross-bars of the rotating frame and engaging with the squared spindle $f$, the worm-wheel being in gear with a worm $m$ upon a spindle $n$, mounted in bearings on the rotating frame and having a pinion N fast on its end, which gears with and revolves about a stationary spur-wheel P, fixed upon the trolley-frame I coaxially with the revolving frame G, so that as the latter frame is rotated the drum will likewise be rotated, the combined motion putting the desired twist into the cable $x$ and at same time winding the cable on the drum. The squared spindle $f$ engages in a corresponding hole in the drum F and through a cylindrical boss $f'$, forming a journal for the drum at the one end, the journal of the worm-wheel M supporting the drum at the other end. The spindle $f$ is suitably secured in position and may be withdrawn for the purpose of removing the drum.

I claim—

The herein-described method of making an electric cable formed of a plurality of wires or strands or wires and strands embedded or inclosed in celluloid, xylonite or similar material by forcing the material under pressure through a die and around and between the wires or strands passing through the die and at same time imparting a twist to the cable thus formed so as, at a single operation, to form a cable wherein the individual wires and strands are insulated from each other and are twisted about the central wire or strand, as described.

HORACE WALTER DOVER.

Witnesses:
T. W. KENNARD,
J. CONWAY.